US012187051B2

(12) United States Patent
Yamashita

(10) Patent No.: US 12,187,051 B2
(45) Date of Patent: Jan. 7, 2025

(54) IMAGE FORMING APPARATUS AND INK JET RECORDING APPARATUS

(71) Applicant: Seiko Epson Corporation, Tokyo (JP)

(72) Inventor: Yusuke Yamashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 25 days.

(21) Appl. No.: 17/368,283

(22) Filed: Jul. 6, 2021

(65) Prior Publication Data

US 2022/0009254 A1 Jan. 13, 2022

(30) Foreign Application Priority Data

Jul. 9, 2020 (JP) ................................ 2020-118309

(51) Int. Cl.

| | |
|---|---|
| ***B41J 2/045*** | (2006.01) |
| ***B41J 2/175*** | (2006.01) |
| ***B41J 29/13*** | (2006.01) |
| ***B41J 29/38*** | (2006.01) |
| ***H04N 1/00*** | (2006.01) |

(52) U.S. Cl.
CPC .......... *B41J 29/13* (2013.01); *B41J 2/17566* (2013.01); *B41J 29/38* (2013.01); *B41J 2002/17573* (2013.01)

(58) Field of Classification Search
CPC .... B41J 29/13; B41J 2/17566; B41J 2/04548; B41J 2/17573; H04N 1/00496; H04N 1/00411; H04N 2201/0094
See application file for complete search history.

(56) References Cited

U.S. PATENT DOCUMENTS

| | | | |
|---|---|---|---|
| 7,469,981 | B2 | 12/2008 | Katsuyama et al. |
| 8,152,294 | B2 | 4/2012 | Katsuyama et al. |
| 8,485,653 | B2 | 7/2013 | Katsuyama et al. |
| 9,144,988 | B2 | 9/2015 | Hirabayashi |
| 9,440,467 | B2 | 9/2016 | Hirabayashi |
| 9,891,778 | B2 | 2/2018 | Nakamura et al. |
| 9,921,707 | B2 | 3/2018 | Nakamura et al. |
| 10,289,257 | B2 | 5/2019 | Nakamura et al. |
| 10,343,409 | B2 | 7/2019 | Higuchi et al. |
| 2006/0023005 | A1 | 2/2006 | Katsuyama et al. |

(Continued)

FOREIGN PATENT DOCUMENTS

| | | |
|---|---|---|
| CN | 104756220 | 7/2015 |
| JP | H02-158377 A | 6/1990 |

(Continued)

*Primary Examiner* — Jason S Uhlenhake
(74) *Attorney, Agent, or Firm* — WORKMAN NYDEGGER

(57) ABSTRACT

An image forming apparatus includes an image forming portion that forms an image on a medium, a casing that houses the image forming portion, a power operating portion for use in switching on and off the main power source of the image forming apparatus, and a touch operation portion for use in inputting operations on the image forming apparatus. Assuming that a direction in which the casing faces a user when the touch operation portion is used is a front-to-back direction, the power operating portion is disposed at a one side in a lateral direction crossing the front-to-back direction at a front of the casing in the front-to-back direction, and the touch operation portion is disposed at an other side at the front of the casing in the front-to-back direction.

13 Claims, 10 Drawing Sheets

(56) References Cited

U.S. PATENT DOCUMENTS

| | | | | |
|---|---|---|---|---|
| 2008/0044197 | A1* | 2/2008 | Muraki | G03G 15/5016 399/81 |
| 2009/0074494 | A1 | 3/2009 | Katsuyama et al. | |
| 2011/0298873 | A1 | 12/2011 | Katsuyama et al. | |
| 2013/0188209 | A1 | 7/2013 | Horikawa et al. | |
| 2015/0002588 | A1 | 1/2015 | Hirabayashi | |
| 2015/0242026 | A1* | 8/2015 | Nakamura | H04N 1/00411 345/174 |
| 2015/0284170 | A1 | 10/2015 | Igarashi et al. | |
| 2015/0352869 | A1 | 12/2015 | Hirabayashi | |
| 2016/0059601 | A1* | 3/2016 | Arimori | B41J 2/04548 347/19 |
| 2016/0350637 | A1* | 12/2016 | Kawana | B41J 2/17509 |
| 2017/0308209 | A1 | 10/2017 | Nakamura et al. | |
| 2018/0013905 | A1* | 1/2018 | Kuroki | H04N 1/0044 |
| 2018/0029392 | A1* | 2/2018 | Matsuzaki | B41J 2/17546 |
| 2018/0111378 | A1* | 4/2018 | Kudo | B41J 2/17566 |
| 2018/0136763 | A1 | 5/2018 | Nakamura et al. | |
| 2018/0170064 | A1 | 6/2018 | Higuchi et al. | |
| 2019/0235673 | A1 | 8/2019 | Nakamura et al. | |
| 2019/0263126 | A1* | 8/2019 | Tanaka | B41J 2/185 |
| 2020/0079109 | A1* | 3/2020 | Ota | B41J 3/36 |
| 2021/0086518 | A1* | 3/2021 | Hizawa | B41J 2/17503 |
| 2021/0283918 | A1* | 9/2021 | Takabayashi | B41J 2/1721 |

FOREIGN PATENT DOCUMENTS

| | | | |
|---|---|---|---|
| JP | 2004-230880 | A | 8/2004 |
| JP | 2007-168133 | A | 7/2007 |
| JP | 2010-192639 | A | 9/2010 |
| JP | 2013-150247 | A | 8/2013 |
| JP | 2015-009421 | A | 1/2015 |
| JP | 2017-001249 | A | 1/2017 |
| JP | 2017-030305 | | 2/2017 |
| JP | 2017-202688 | A | 11/2017 |
| JP | 2018-058291 | A | 4/2018 |
| JP | 2018-111260 | A | 7/2018 |
| JP | 2018-129580 | A | 8/2018 |
| JP | 2019-048479 | | 3/2019 |

* cited by examiner

IMAGE FORMING APPARATUS AND INK JET RECORDING APPARATUS

The present application is based on, and claims priority from JP Application Serial Number 2020-118309, filed Jul. 9, 2020, the disclosure of which is hereby incorporated by reference herein in its entirety.

BACKGROUND

1. Technical Field

The present disclosure relates to an image forming apparatus and an ink jet recording apparatus.

2. Related Art

JP-A-2017-30305 discloses an image forming apparatus including an operation panel at which a display on which a print-condition setting screen or the like is displayed, buttons for inputting print conditions and various instructions, and an operating portion operated using a touch panel integrated with the display are disposed.

However, the image forming apparatus disclosed in JP-A-2017-30305 is configured such that a power button and the operating portion are disposed in the same operation panel. Since the power button and the operating portion are disposed close to each other, there is a possibility that the power button may be operated by mistake when the operating portion is to be operated.

SUMMARY

An image forming apparatus according to a first aspect of the present disclosure includes an image forming portion that forms an image on a medium, a casing that houses the image forming portion, a power operating portion for use in switching on and off the main power source of the image forming apparatus, and a touch operation portion for use in inputting operations on the image forming apparatus. Assuming that a direction in which the casing faces a user when the touch operation portion is used is a front-to-back direction, the power operating portion is disposed at a one side in a lateral direction crossing the front-to-back direction at a front of the casing in the front-to-back direction, and the touch operation portion is disposed at an other side different from the side on which the power operating portion is disposed.

An ink jet recording apparatus according to a second aspect of the present disclosure is the image forming apparatus according to the first aspect, wherein the image forming portion includes an ejecting head that ejects liquid droplets.

DESCRIPTION OF EXEMPLARY EMBODIMENTS

First Embodiment

Figure 1:
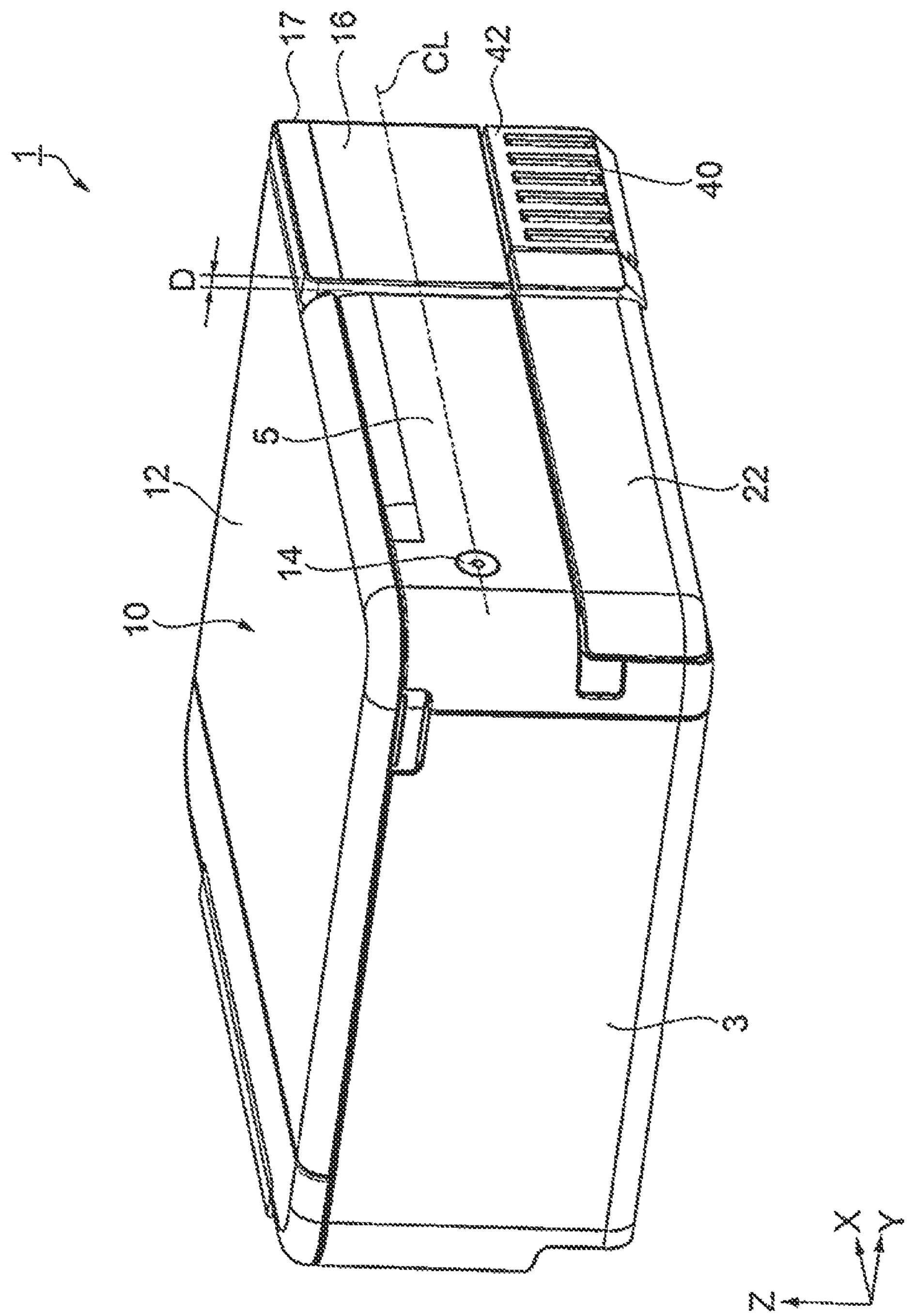
FIG. 1 is a perspective view of an image forming apparatus according to a first embodiment, illustrating the configuration thereof.

The configuration of an image forming apparatus 1 according to a first embodiment will be described with reference to the drawings. In this embodiment, an ink jet printer including an ejecting head 32 that ejects liquid, such as ink, onto a medium will be described as an example of the image forming apparatus 1. Of the coordinates described in the drawings, assuming that the image forming apparatus 1 is placed on a horizontal plane, three virtual axes orthogonal to one another are referred to as the X-axis, the Y-axis, and the Z-axis. The Y-axis is an axis parallel to a front-to-back direction in which a casing 3 faces the user when the image forming apparatus 1 is used, in which the arrow indicating the Y-axis points is assumed to be "front". The X-axis is an axis parallel to the lateral direction of the casing 3, in which the arrow indicating the X-axis points is assumed to be "right". The Z-axis is an axis parallel to the vertical direction of the casing 3, in which the arrow indicating the Z-axis points is assumed to be "above". The distal ends of the arrows indicating the individual axes point are in "the + direction", and the base ends of the arrows are in "the − direction".

Figure 2:
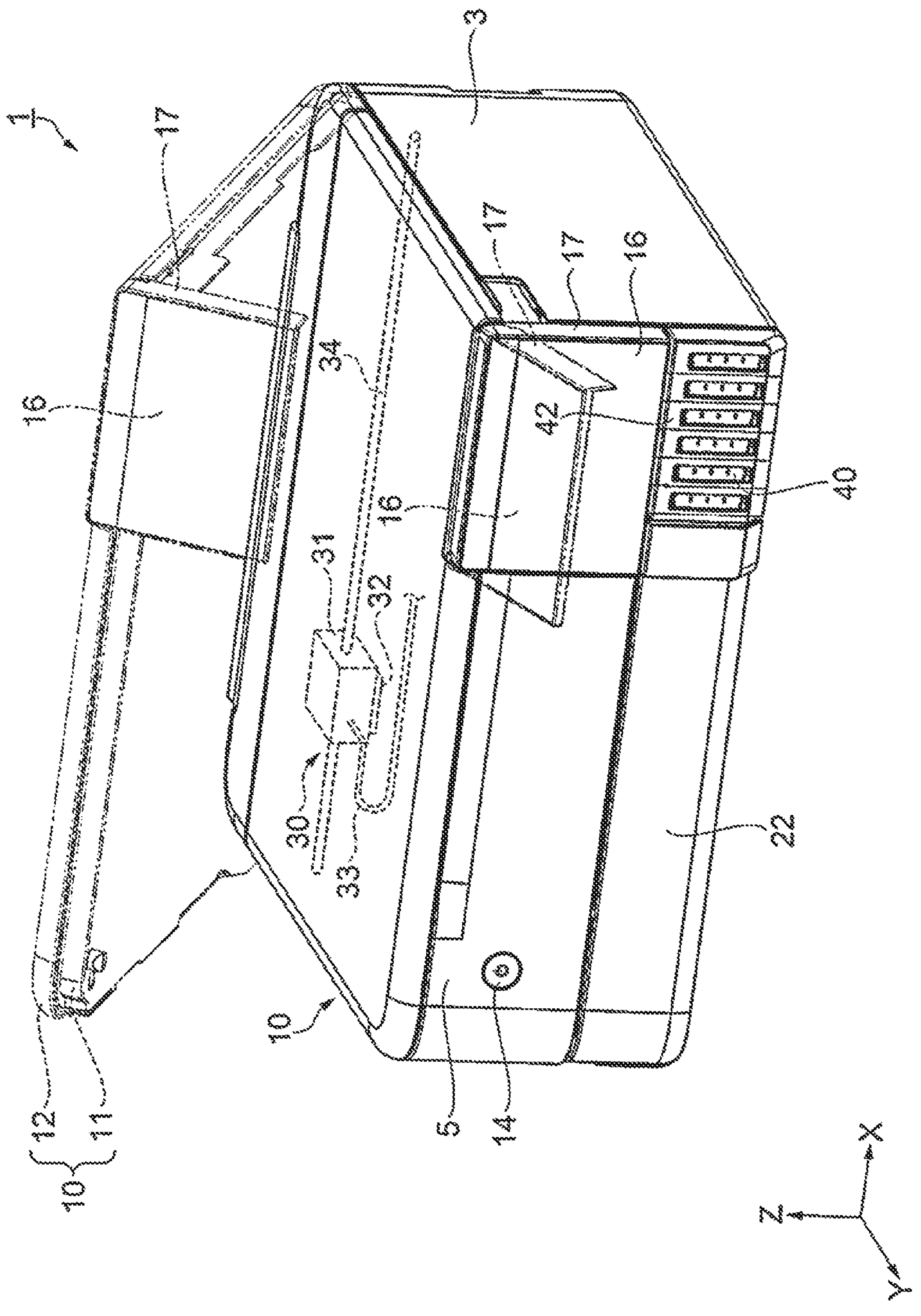
FIG. 2 is a perspective view of the image forming apparatus in which the scanner is in an open state and the touch operation portion is in a tilting state.
Figure 3:
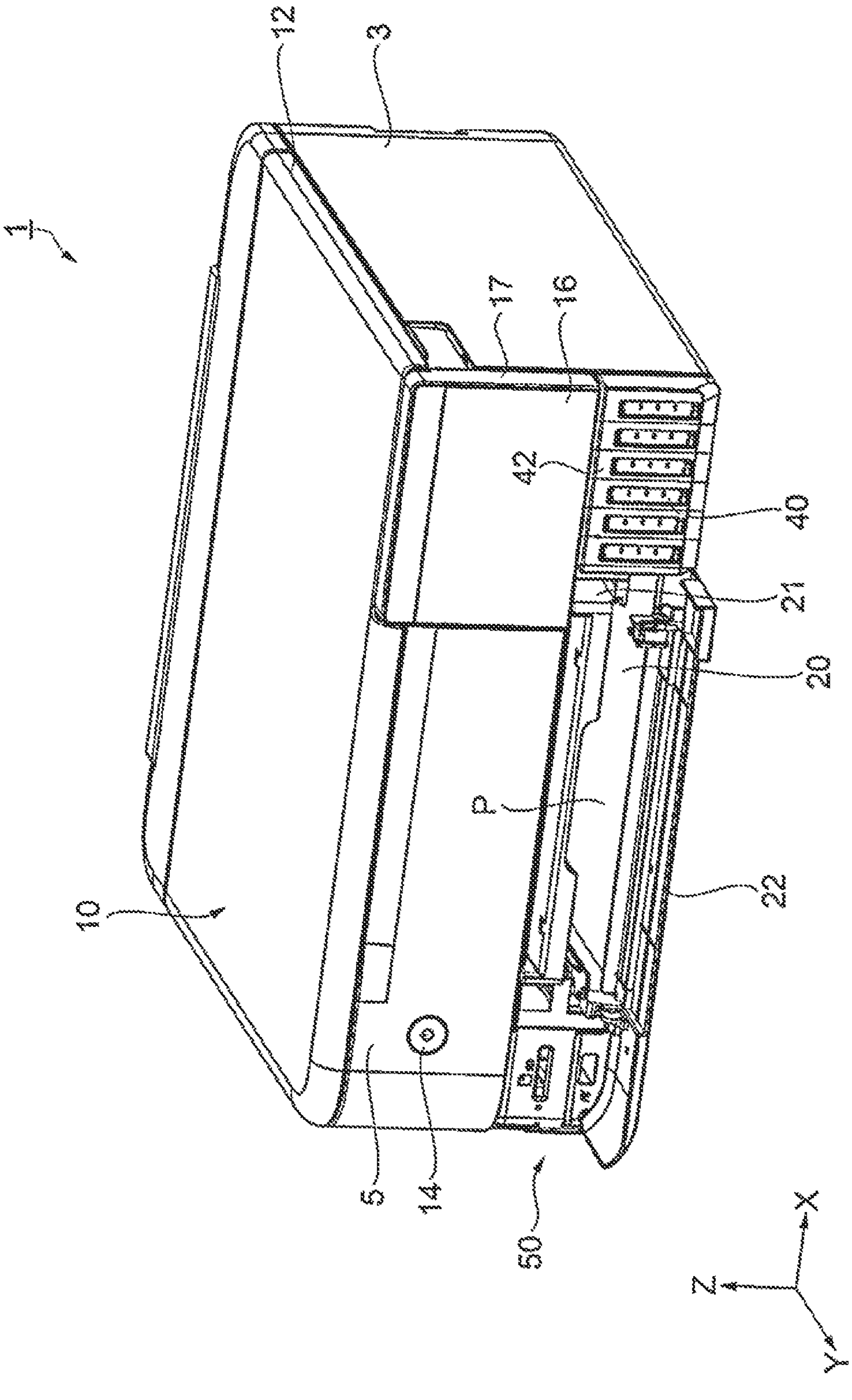
FIG. 3 is a perspective view of the image forming apparatus in which the front door is in an open state.

As shown in FIGS. 1 to 3, the image forming apparatus 1 includes the rectangular parallelepiped casing 3, an image forming portion 30 housed in the casing 3, and a scanner 10 disposed on the top of the casing 3.

The scanner 10 includes a scanner housing 11 rotatably mounted to the casing 3 and a scanner cover 12 rotatably mounted to the scanner housing 11. The scanner housing 11 is a cover that openably covers the image forming portion 30. The scanner housing 11 is a platen on which an original is to be placed. The scanner housing 11 houses an imaging module that reads a placed original. The imaging module includes a contact optical line image sensor that is long along the width of the original, a light source, and a lens and converts characters or images on the original to an electrical signal. The scanner cover 12 is a cover that openably covers the platen. The scanner 10 constitutes the upper surface of the casing 3 when closed.

The image forming portion 30 forms an image on a medium P with liquid. The image forming portion 30 includes an ejecting head 32, a carriage 31 on which the ejecting head 32 is mounted, a guide shaft 34 that supports the carriage 31, and a transporting portion that transports the medium P. The ejecting head 32 is an ink jet head that ejects droplets of liquid supplied through a tube 33 toward the medium P. The transporting portion includes various rollers for transporting the medium P in the transporting direction and a motor that supplies a rotational driving force to the rollers.

The carriage 31 is configured to move along a guide shaft 34 back and forth in the width direction of the medium P crossing the transporting direction in which the medium P is transported. In FIG. 2, the medium P transporting direction is the +Y direction, and the width direction of the medium P is the X direction at the position facing the image forming portion 30. In other words, the ejecting head 32 moves in the +X direction or the −X direction together with the carriage 31. The image forming apparatus 1 records a desired image on the medium P by alternately repeating the operation of ejecting droplets onto the medium P while moving the ejecting head 32 in the width direction of the medium P and the operation of transporting the medium P in the transporting direction.

Next, the layout of the components disposed at the front of the casing 3 facing the user will be described. At the front of the casing 3, a touch operation portion 16 is disposed at the upper right, a liquid-level visual recognition portion 42 is disposed under the touch operation portion 16, a front panel 5 on which a power operating portion 14 is provided is disposed on the left of the touch operation portion 16, and a front door 22 is disposed on the left of the liquid-level visual recognition portion 42.

The image forming apparatus 1 includes the power operating portion 14 for switching on and off the main power supply of the image forming apparatus 1. The power operating portion 14 is disposed on one side in the lateral direction crossing the front-to-back direction at the front of the casing 3 in the front-to-back direction. The power operating portion 14 of this embodiment is disposed on the left with respect to the center of the casing 3 and at the front of the casing 3 in the front-to-back direction. The power operating portion 14 is disposed at the front panel 5 which constitutes part of the casing 3. In other words, the power operating portion 14 does not tilt with respect to the casing 3. The power operating portion 14 includes a mechanical switch. Examples of the mechanical switch include a tactile switch that energizes an electrical circuit by the user pressing a button and a push button switch. These switches allow the user to recognize a tactile feel, which is the feel of switch operation.

The image forming apparatus 1 includes a touch operation portion 16 for use in inputting operations to the image forming apparatus 1. The touch operation portion 16 is a touch panel type input unit integrated with a display panel 17, such as a liquid crystal display or an organic electroluminescent (EL) display. The touch operation portion 16 uses a capacitive sensing method or a resistive touch method. The display panel 17 displays icons that guide input operations on the image forming apparatus 1. The touch operation portion 16 detects the position on the display panel 17 that the user has touched. Thus, the chosen icon is specified.

The touch operation portion 16 is rotatably mounted on the right with respect to the center in the lateral direction at the end of the scanner housing 11 of the scanner 10 in the +Y direction. In other words, the touch operation portion 16 is disposed on the other side different from the side on which the power operating portion 14 is disposed in a state in which the scanner 10 is closed and can rotate to an open state together with the scanner 10. The touch operation portion 16 is supported at the lower end so as to tilt with respect to the casing 3, with the scanner 10 kept closed. This enhances the visuality of the display panel 17 and the operability of the touch operation portion 16. The lower end of the touch operation portion 16 and the lower end of the front panel 5 including the power operating portion 14 are flush with each other in a state in which the touch operation portion 16 does not tilt, which provide the apparatus with an improved design.

The power operating portion 14 is disposed on an extension CL of the center of the touch operation portion 16 in the vertical direction in a state in which the scanner 10 is closed and the touch operation portion 16 is nontilted. The power operating portion 14 and the touch operation portion 16 are disposed, with a level difference D from several millimeters to 1 cm therebetween in the front-to-back direction of the casing 3, in other words, in the Y direction. In the image forming apparatus 1 of this embodiment, the touch operation portion 16 protrudes in the +Y direction from the front panel 5 on which the power operating portion 14 is disposed.

The casing 3 houses a plurality of liquid containers 40 that contain liquid to be supplied to the ejecting head 32 of the image forming portion 30. At the front of the casing 3, the liquid-level visual recognition portion 42 having an opening through which the amount of liquid remaining in the liquid containers 40 can be viewed is provided at the lower portion in the vertical direction and on the right with respect to the center in the lateral direction. In other words, the liquid-level visual recognition portion 42 is disposed under the touch operation portion 16 in a state in which the scanner 10 is closed and the touch operation portion 16 is nontilted. The plurality of liquid containers 40 are provided, in the casing 3, next to the openings of the liquid-level visual recognition portion 42. The liquid in the liquid containers 40 is supplied to the ejecting head 32 through a tube 33. The user can see the positions of the surfaces of the liquid contained in the liquid containers 40 through the openings of the liquid-level visual recognition portion 42.

A front door 22 is provided on the left of the liquid-level visual recognition portion 42 in the lateral direction of the casing 3 and under the front panel 5 of the casing 3 in the vertical direction. The lower end of the front door 22 is rotatably supported by the casing 3, and the upper end of the front door 22 is opened and closed with respect to the casing 3. The upper end of the front door 22 and the upper end of the liquid-level visual recognition portion 42 are flush with each other in a state in which the front door 22 is closed, which provides the apparatus with an improved design.

An externally coupling portion 50 that couples an external device is provided at the front of the casing 3 in the state in which the front door 22 is opened. The externally coupling portion 50 of this embodiment is disposed on the left of the casing 3 in the lateral direction. Examples of the externally coupling portion 50 include a slot for coupling a secure digital (SD) card in which images or the like are recorded and a connector for a universal serial bus (USB) cable that couples a camera, a personal computer (PC), or the like by wire. The power operating portion 14 is disposed above the externally coupling portion 50 in the vertical direction of the casing 3.

As shown in FIG. 3, a medium container 20 that contains the medium P from the front of the casing 3 and a medium discharging portion 21 that discharges the medium P from the front of the casing 3 are provided between the liquid-level visual recognition portion 42 and the externally coupling portion 50 in the state where the front door 22 is opened. The medium container 20 is a medium feed tray on which the medium P before recording to be fed to the image forming portion 30 is placed. The medium discharging portion 21 is an output tray that supports the medium P printed at the image forming portion 30 and discharged from the casing 3 from below. The medium discharging portion 21 is disposed above the medium container 20. In other words, the medium discharging portion 21 is disposed in the +Z direction with respect to the medium container 20, and the medium container 20 is disposed in the −Z direction with respect to the medium discharging portion 21. When the front door 22 is opened with respect to the casing 3, the medium container 20 and the medium discharging portion 21 are exposed, and the medium container 20 and the medium discharging portion 21 can be inserted into or extracted from the casing 3.

The medium container 20 is configured to contain the medium P. By inserting the medium container 20 containing the medium P into the casing 3, the medium P can be set in the casing 3. The image forming apparatus 1 executes recording on the medium P in the state where the front door 22 is opened with respect to the casing 3 and part of the medium discharging portion 21 is extracted out of the casing 3. The medium P contained in the medium container 20 is sent toward the image forming portion 30 while being curved in the casing 3 so that the orientation is reversed, and after an image is recorded at the image forming portion 30, the medium P is sent to the medium discharging portion 21 and is placed on the medium discharging portion 21.

Figure 4:
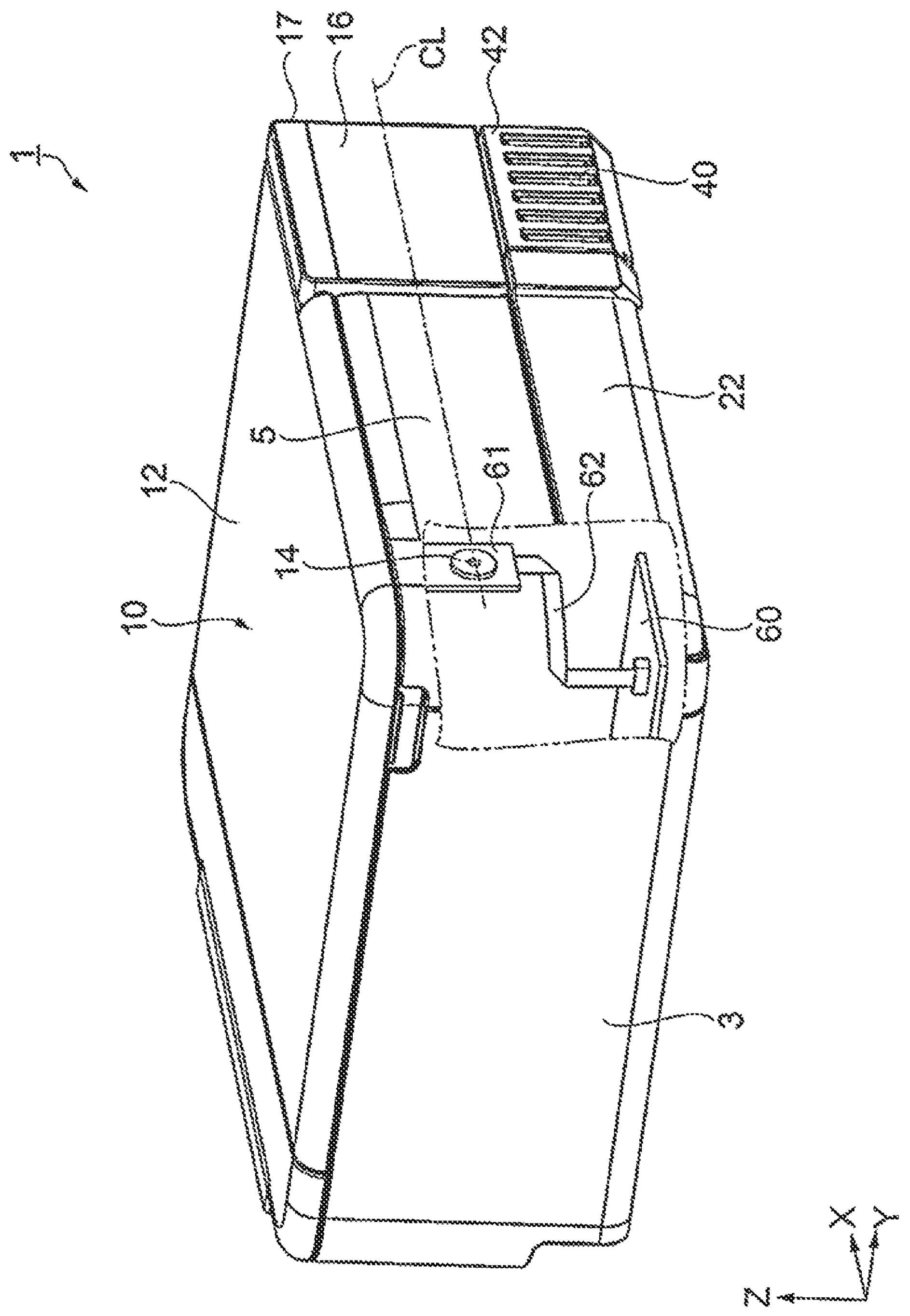
FIG. 4 is a perspective view of a power operating portion illustrating the internal configuration thereof.

As shown in FIG. 4, the image forming apparatus 1 includes a main substrate 60 in the casing 3. The main substrate 60 incorporates a main power source for the image forming apparatus 1, a power circuit that supplies power to the components of the image forming apparatus 1, a control unit that controls the components of the image forming apparatus 1, and so on. The main substrate 60 is disposed at a position different from that of the power operating portion 14. The main substrate 60 of this embodiment is disposed at the bottom of the back of the externally coupling portion 50 in the front-to-back direction of the casing 3. The power operating portion 14 includes a power operating board 61 that implements a mechanical switch. The power operating board 61 of the power operating portion 14 disposed away from the main substrate 60 is electrically coupled to the main substrate 60 via a cable 62. The cable 62 may be a flexible flat cable. Since the flexible flat cable is thin and flexible and allows high-density packaging, the apparatus can be reduced in size.

In this embodiment, the image forming apparatus 1 is an ink jet printer, but is intended as an example only. The image forming apparatus may be a laser printer, a dot-impact printer, a copying machine that include the power operating portion 14 and the touch operation portion 16, or a multi-functional apparatus having such a printing function and another function, such as a facsimile function. This embodiment illustrates the configuration in which the power operating portion 14 is disposed at the left on the front, and the touch operation portion 16 is disposed at the left on the front. Alternatively, the power operating portion 14 may be disposed at the right on the front, and the touch operation portion 16 may be disposed at the left on the front. This embodiment illustrates the configuration in which the touch operation portion 16 has a level-difference portion protruding in the +Y direction from the power operating portion 14. Alternatively, the power operating portion 14 may have a level-difference portion protruding in the +Y direction from the touch operation portion 16.

The image forming apparatus 1 according to the first embodiment provides the advantageous effects described below.

The power operating portion 14 and the touch operation portion 16 of the image forming apparatus 1 are disposed away from each other in the lateral direction at the front of the casing 3. This allows providing the image forming apparatus 1 configured to prevent an erroneous operation caused by the user who is going to operate the touch operation portion 16 touching the power operating portion 14 by mistake.

Since the power operating portion 14 and the touch operation portion 16 are disposed with the level-difference D in the front-to-back direction, an erroneous operation on the power operating portion 14 caused by an operation on the touch operation portion 16 can be prevented.

The power operating portion 14 is disposed above the externally coupling portion 50 of the casing 3 in the vertical direction. In other words, the power operating portion 14 is disposed above the front door 22 in the state where the front door 22 is closed. Thus, the image forming apparatus 1 has an improved design.

The power operating portion 14 is a mechanical switch. To operate the mechanical switch, the user needs to press the button, which may reduce an erroneous operation as compared with a touch switch.

The power operating portion 14 is coupled to the main substrate 60 disposed at a different position via the cable 62. This makes it easy to dispose the power operating portion 14 at a different position from that of the main substrate 60.

The power operating portion 14 is disposed on the extension CL of the center of the touch operation portion 16 in the vertical direction. This allows the power operating portion 14 to be disposed in balance in the horizontal direction with respect to the touch operation portion 16, improving the design of the image forming apparatus 1.

The touch operation portion 16 is supported so as to be able to tilt with respect to the casing 3, and the power operating portion 14 is disposed at the front panel 5 of the casing 3 which does not tilt. Since the touch operation portion 16 is operated normally in a tilted state, an erroneous operation on the power operating portion 14 caused by an operation on the touch operation portion 16 can be prevented.

The liquid-level visual recognition portion 42 for viewing the remaining amount of liquid is disposed under the touch operation portion 16 in the vertical direction of the casing 3. Thus, the touch operation portion 16 and the liquid-level visual recognition portion 42 are integrally laid out in the vertical direction of the casing 3. This makes it easy to see both of them at once and provides high operability.

The ink jet recording apparatus is the image forming apparatus 1 in which the ejecting head 32 that ejects liquid droplets is disposed at the image forming portion 30. Thus, an ink jet recording apparatus configured to prevent an erroneous operation caused by the user who is going to operate the touch operation portion 16 touching the power operating portion 14 by mistake is provided.

Second Embodiment

An image forming apparatus 101 according to a second embodiment will be described with reference to the drawings. The same components as those of the first embodiment will be denoted by the same reference signs, and duplicated descriptions thereof will be omitted.

Figure 5:
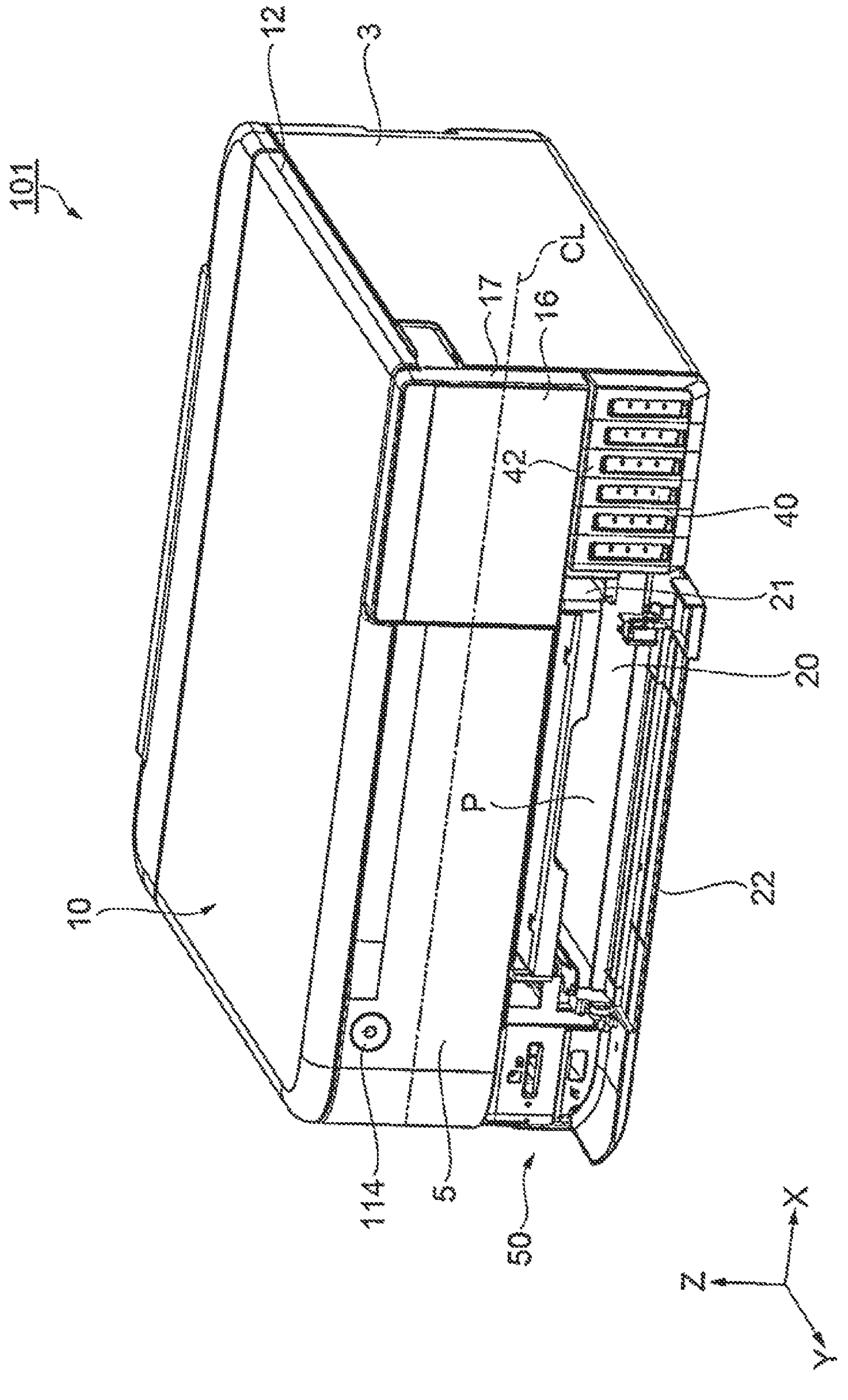
FIG. 5 is a perspective view of an image forming apparatus according to a second embodiment, illustrating the configuration thereof.

As shown in FIG. 5, the image forming apparatus 101 includes a rectangular parallelepiped casing 3, the image forming portion 30 housed in the casing 3, described in the first embodiment, and a scanner 10 disposed on the top of the casing 3. The image forming apparatus 101 further includes a power operating portion 114 for switching on and off the main power supply of the image forming apparatus 101, and a touch operation portion 16 for use in inputting operations to the image forming apparatus 101. At the front of the casing 3, the touch operation portion 16 is disposed at the upper right, and a front panel 5 on which the power operating portion 114 is provided is disposed on the left of the touch operation portion 16.

The power operating portion 114 is disposed at the front of the casing 3 in the front-to-back direction and on the left with respect to the center in the lateral direction. The power operating portion 114 is disposed on the front panel 5 which is part of the casing 3. The power operating portion 114 is disposed on an extension CL of the center in the vertical direction of the touch operation portion 16 in a state in which the scanner 10 is closed and the touch operation portion 16 is nontilted.

The power operating portion 114 and the touch operation portion 16 of the image forming apparatus 101 are disposed away from each other in the lateral direction at the front of the casing 3. This allows providing the image forming apparatus 101 configured to prevent an erroneous operation caused by the user who is going to operate the touch operation portion 16 touching the power operating portion 114 by mistake.

Third Embodiment

An image forming apparatus 201 according to a third embodiment will be described with reference to the drawings. The same components as those of the first embodiment will be denoted by the same reference signs, and duplicated descriptions thereof will be omitted.

Figure 6:
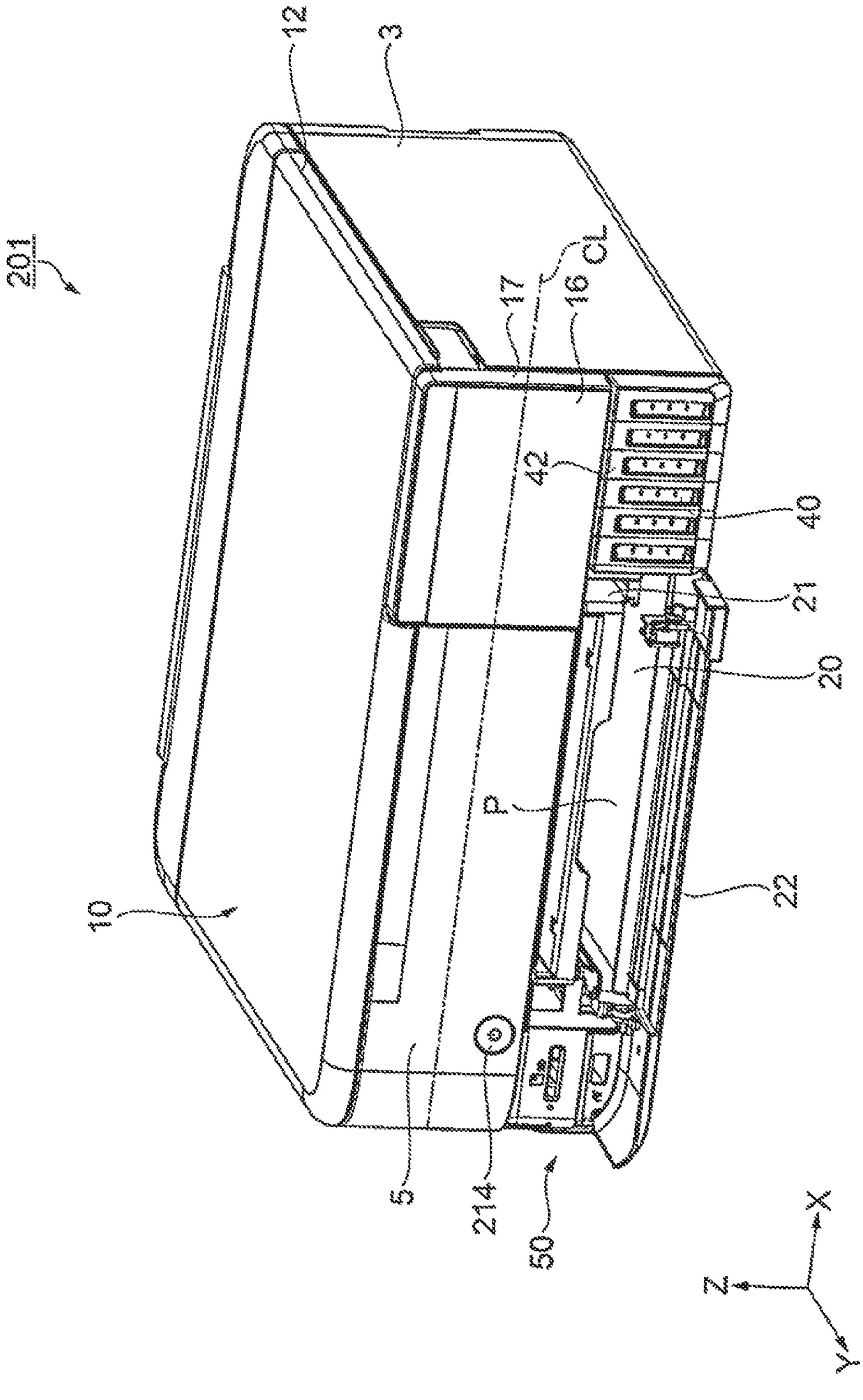
FIG. 6 is a perspective view of an image forming apparatus according to a third embodiment, illustrating the configuration thereof.

As shown in FIG. 6, the image forming apparatus 201 includes a rectangular parallelepiped casing 3, the image forming portion 30 housed in the casing 3, described in the first embodiment, and a scanner 10 disposed on the top of the casing 3. The image forming apparatus 201 further includes a power operating portion 214 for switching on and off the main power supply of the image forming apparatus 201, and a touch operation portion 16 for use in inputting operations to the image forming apparatus 201. At the front of the casing 3, the touch operation portion 16 is disposed at the upper right, and a front panel 5 on which the power operating portion 214 is provided is disposed on the left of the touch operation portion 16.

The power operating portion 214 is disposed at the front of the casing 3 in the front-to-back direction and on the left with respect to the center in the lateral direction. The power operating portion 214 is disposed on the front panel 5 which is part of the casing 3. The power operating portion 214 is disposed below an extension CL of the center in the vertical direction of the touch operation portion 16 in a state in which the scanner 10 is closed and the touch operation portion 16 is nontilted.

The power operating portion 214 and the touch operation portion 16 of the image forming apparatus 201 are disposed away from each other in the lateral direction at the front of the casing 3. This allows providing the image forming apparatus 201 configured to prevent an erroneous operation caused by the user who is going to operate the touch operation portion 16 touching the power operating portion 214 by mistake.

Fourth Embodiment

An image forming apparatus 301 according to a fourth embodiment will be described with reference to the drawings. The same components as those of the first embodiment will be denoted by the same reference signs, and duplicated descriptions thereof will be omitted.

Figure 7:
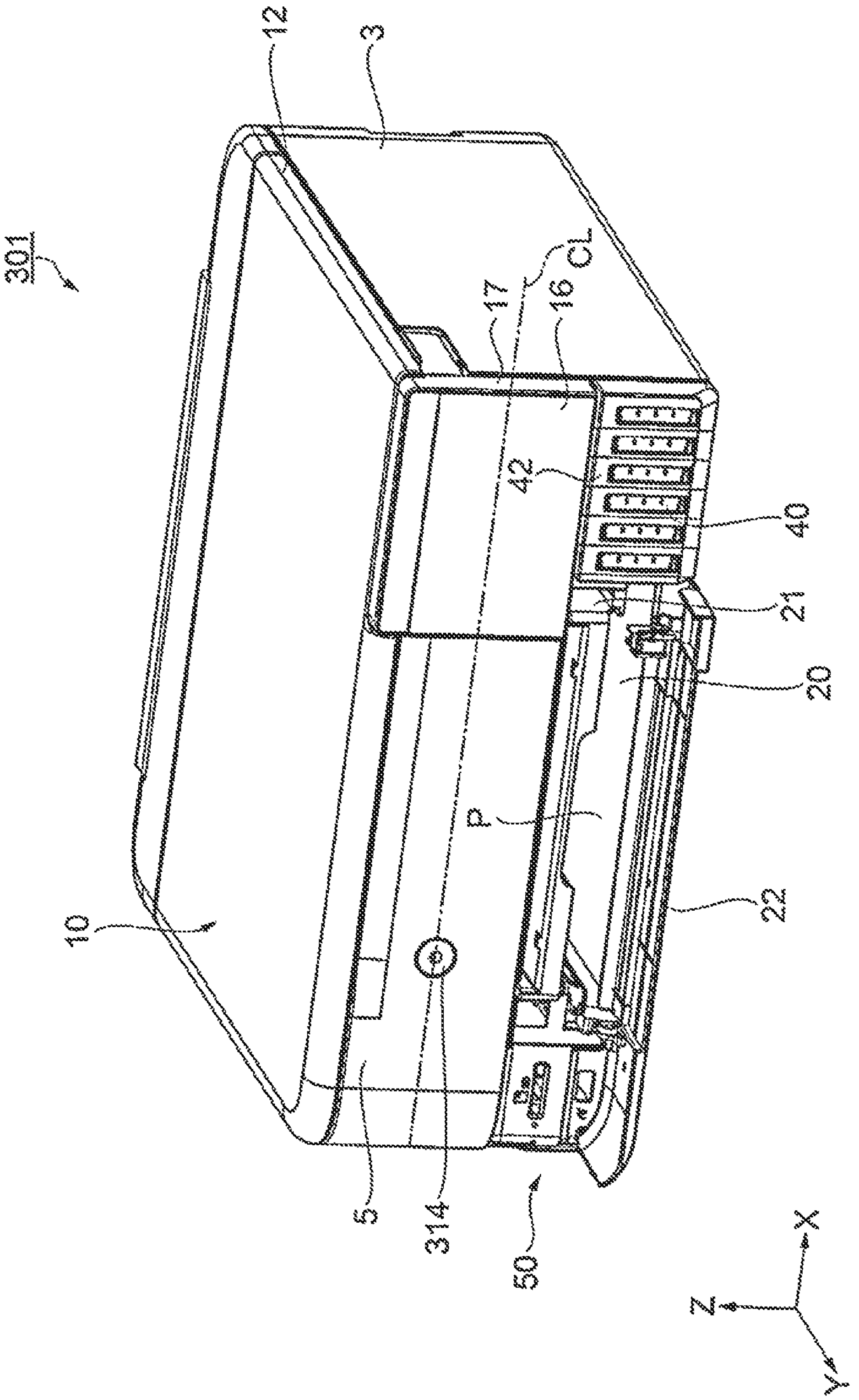
FIG. 7 is a perspective view of an image forming apparatus according to a fourth embodiment, illustrating the configuration thereof.

As shown in FIG. 7, the image forming apparatus 301 includes a rectangular parallelepiped casing 3, the image forming portion 30 housed in the casing 3, described in the first embodiment, and a scanner 10 disposed on the top of the casing 3. The image forming apparatus 301 further includes a power operating portion 314 for switching on and off the main power supply of the image forming apparatus 301, and a touch operation portion 16 for use in inputting operations to the image forming apparatus 301. At the front of the casing 3, the touch operation portion 16 is disposed at the upper right, and a front panel 5 on which the power operating portion 314 is provided is disposed on the left of the touch operation portion 16.

The power operating portion 314 is disposed at the front of the casing 3 in the front-to-back direction and on the left with respect to the center in the lateral direction. The power operating portion 314 is disposed on the front panel 5 which is part of the casing 3. The power operating portion 314 is disposed on an extension CL of the center of the touch operation portion 16 in the vertical direction in a state in which the scanner 10 is closed and the touch operation portion 16 is nontilted. The power operating portion 314 is disposed above the medium discharging portion 21 in the vertical direction of the casing 3. The power operating portion 314 is disposed above the medium container 20 in the vertical direction of the casing 3.

The power operating portion 314 and the touch operation portion 16 of the image forming apparatus 301 are disposed away from each other in the lateral direction at the front of the casing 3. This allows providing the image forming apparatus 301 configured to prevent an erroneous operation caused by the user who is going to operate the touch operation portion 16 touching the power operating portion 314 by mistake.

The power operating portion 314 is disposed above the medium discharging portion 21. In other words, the power operating portion 314 is disposed above the front door 22 in the state where the front door 22 is closed. Thus, the image forming apparatus 301 has an improved design.

The power operating portion 314 is disposed above the medium container 20. In other words, the power operating portion 314 is laid out above the front door 22 in the state where the front door 22 is closed. Thus, the image forming apparatus 301 has an improved design.

Fifth Embodiment

An image forming apparatus 401 according to a fifth embodiment will be described with reference to the drawings. The same components as those of the first embodiment will be denoted by the same reference signs, and duplicated descriptions thereof will be omitted.

Figure 8:
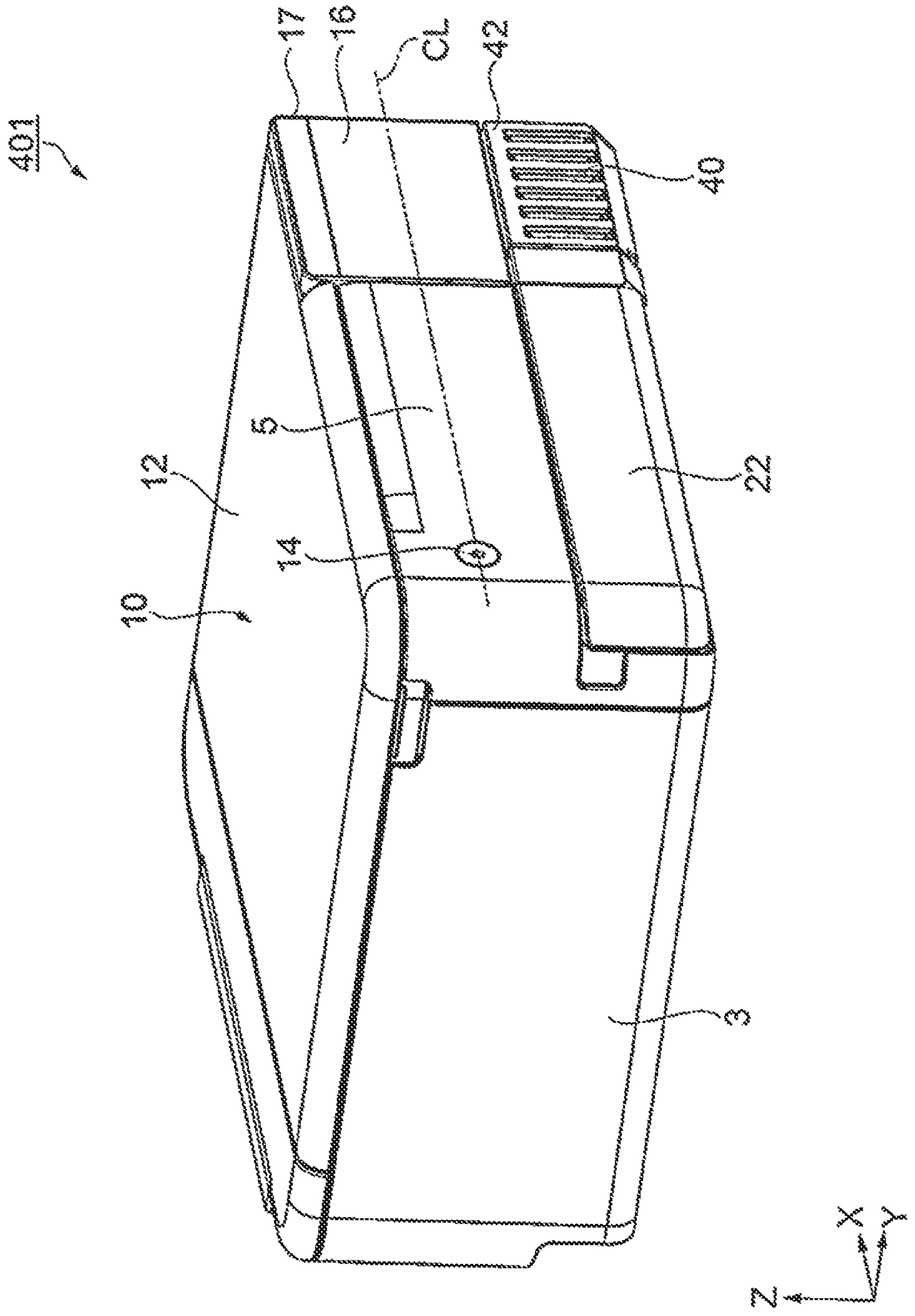
FIG. 8 is a perspective view of an image forming apparatus according to a fifth embodiment, illustrating the configuration thereof.

As shown in FIG. 8, the image forming apparatus 401 includes a rectangular parallelepiped casing 3, the image forming portion 30 housed in the casing 3, described in the first embodiment, and a scanner 10 disposed on the top of the casing 3. The image forming apparatus 401 further includes a power operating portion 14 for switching on and off the main power supply of the image forming apparatus 401, and a touch operation portion 16 for use in inputting operations to the image forming apparatus 401. At the front of the casing 3, the touch operation portion 16 is disposed at the upper right, and a front panel 5 on which the power operating portion 14 is provided is disposed on the left of the touch operation portion 16.

The front panel 5 on which the power operating portion 14 is disposed and the touch operation portion 16 flush with each other in the state where the scanner 10 is closed and the touch operation portion 16 is nontilted. In other words, the image forming apparatus 401 of this embodiment is configured such that the power operating portion 14 and the touch operation portion 16 has no level-difference in the front-to-back direction of the casing 3.

Although the power operating portion 14 and the touch operation portion 16 of the image forming apparatus 401 are disposed without level-difference at the front of the casing 3 in the front-to-back direction, an erroneous operation on the power operating portion 14 caused by an operation on the touch operation portion 16 can be prevented by disposing the power operating portion 14 and the touch operation portion 16 sufficiently away from each other in the lateral direction of the casing 3.

Sixth Embodiment

An image forming apparatus 501 according to a sixth embodiment will be described with reference to the drawings. The same components as those of the first embodiment will be denoted by the same reference signs, and duplicated descriptions thereof will be omitted.

Figure 9:
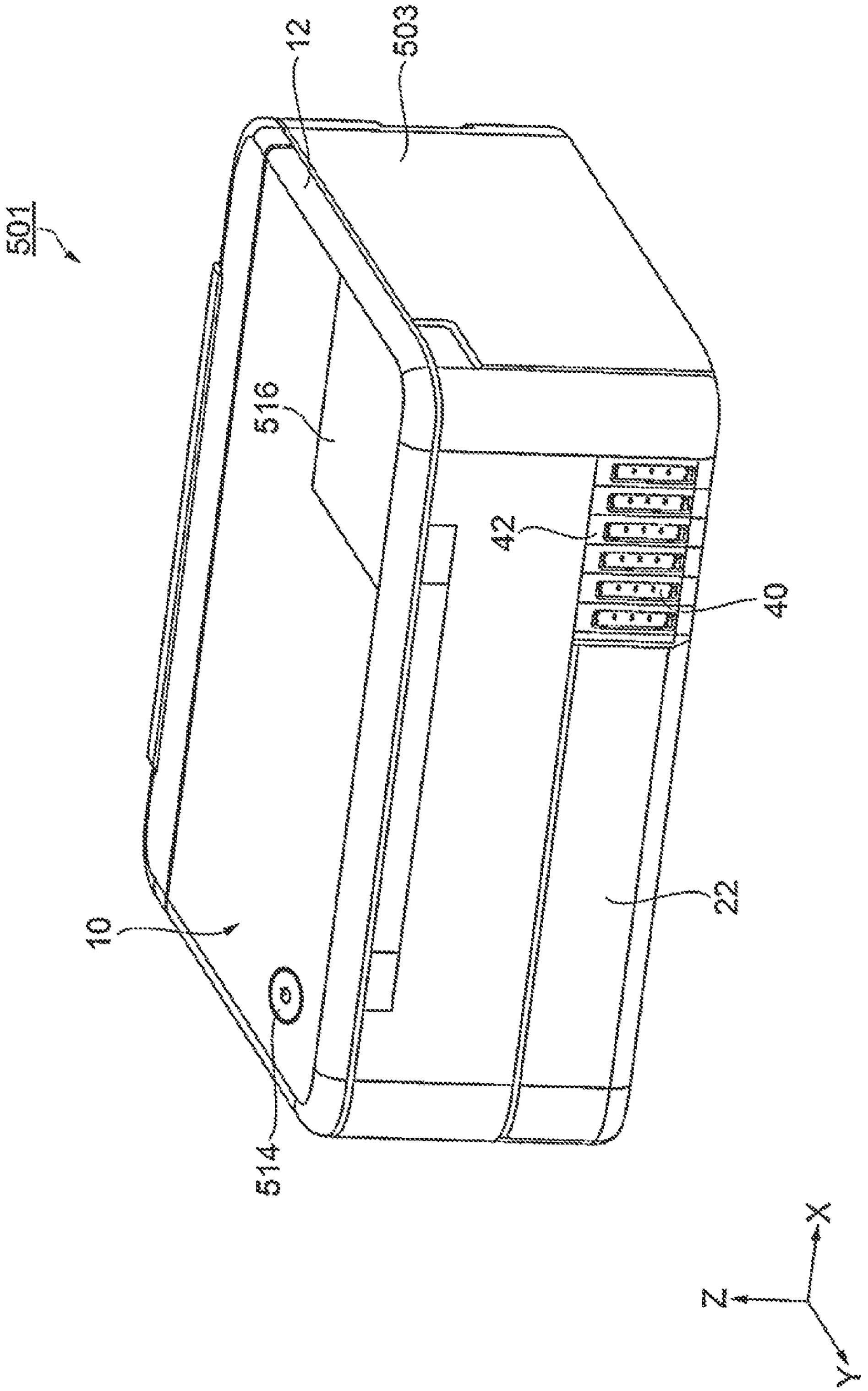
FIG. 9 is a perspective view of an image forming apparatus according to a sixth embodiment, illustrating the configuration thereof.

As shown in FIG. 9, the image forming apparatus 501 includes a rectangular parallelepiped casing 503, the image forming portion 30 housed in the casing 503, described in the first embodiment, and a scanner 10 disposed on the top of the casing 503. The image forming apparatus 501 further includes a power operating portion 514 for switching on and off the main power supply of the image forming apparatus 501, and a touch operation portion 516 for use in inputting operations to the image forming apparatus 501.

The power operating portion 514 is disposed on either of the right and the left with respect to the center in the lateral direction at the front of the casing 503 in the front-to-back direction. The power operating portion 514 of this embodiment is disposed at the front part of the upper surface of the casing 503 and on the left relative to the center.

The touch operation portion 516 is disposed at a front part of the upper surface of the casing 503 and on the right with respect to the center. In other words, the touch operation portion 516 is disposed on the other side different from the side on which the power operating portion 514 is disposed.

Since the image forming apparatus 501 is configured such that the power operating portion 514 and the touch operation portion 516 are disposed away from each other in the lateral direction at the front of the upper surface of the casing 503, an erroneous operation on the power operating portion 514 caused by an operation on the touch operation portion 516 can be prevented.

Seventh Embodiment

An image forming apparatus 601 according to a seventh embodiment will be described with reference to the drawings. The same components as those of the first embodiment will be denoted by the same reference signs, and duplicated descriptions thereof will be omitted.

Figure 10:
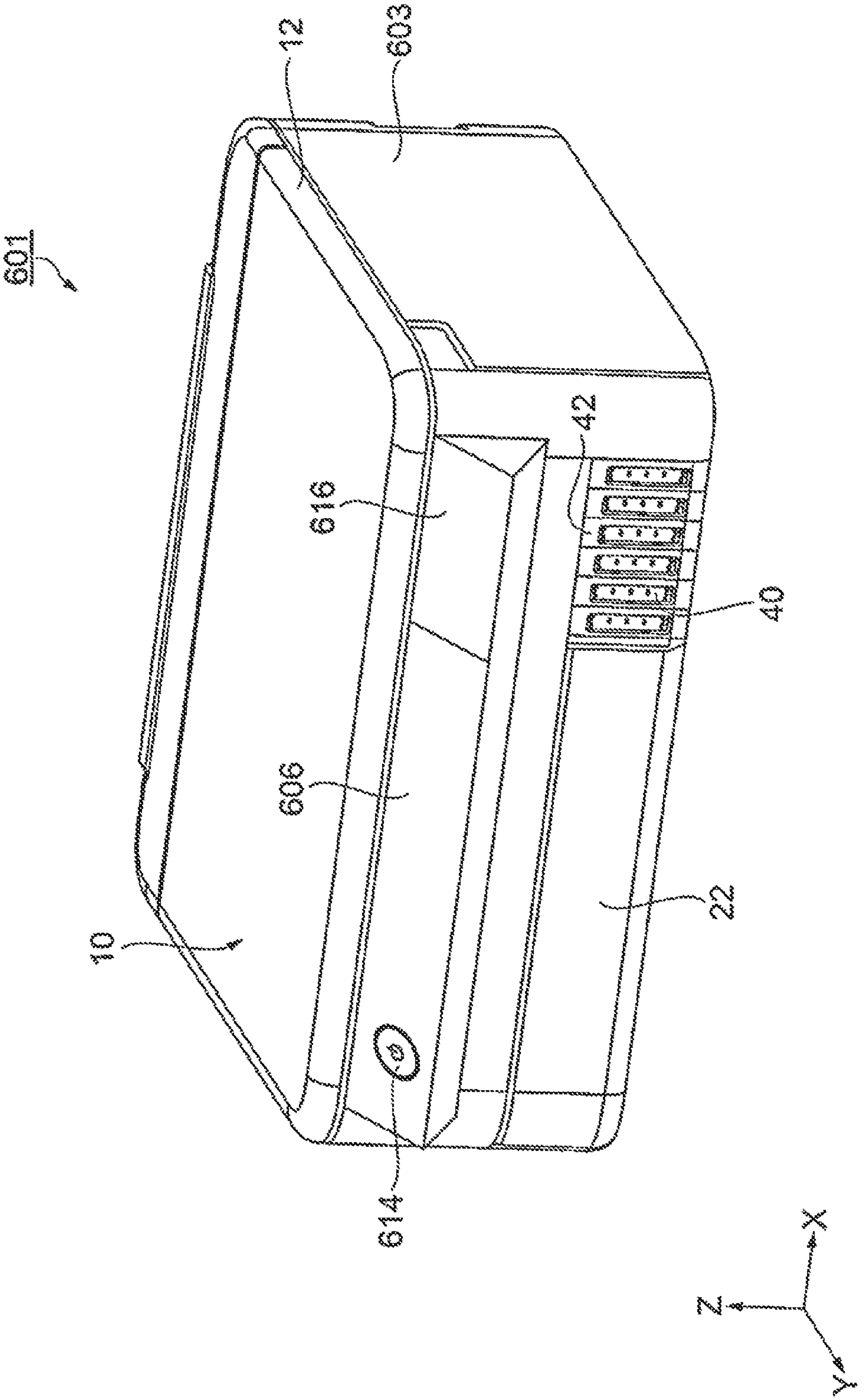
FIG. 10 is a perspective view of an image forming apparatus according to a seventh embodiment, illustrating the configuration thereof.

As shown in FIG. 10, the image forming apparatus 601 includes a rectangular parallelepiped casing 603, the image forming portion 30 housed in the casing 603, described in the first embodiment, and a scanner 10 disposed on the top of the casing 603. The image forming apparatus 601 further includes a power operating portion 614 for switching on and off the main power source of the image forming apparatus 601 and a touch operation portion 616 for use in inputting operations on the image forming apparatus 601.

The power operating portion 614 is disposed on either of the right and the left with respect to the center in the lateral direction at the front of the casing 603 in the front-to-back direction. Specifically, the casing 603 includes an operation panel 606 protruding obliquely downward and forward from the front end of the upper surface of the casing 603. The power operating portion 614 is disposed at the front of the upper surface of the operation panel 606 and on the left with respect to the center.

The touch operation portion 616 is disposed on the upper surface of the operation panel 606 positioned at the front of the casing 603 and on the right with respect to the center. In other words, the touch operation portion 616 is disposed on the other side different from the side on which the power operating portion 614 is disposed.

Since the image forming apparatus 601 is configured such that the power operating portion 614 and the touch operation portion 616 are disposed away from each other in the lateral direction on the upper surface of the operation panel 606, an erroneous operation on the power operating portion 614 caused by an operation on the touch operation portion 616 can be prevented.

What is claimed is:

1. An image forming apparatus comprising:

an image forming portion that forms an image on a medium;

a casing that houses the image forming portion and has a first surface;

a power operating portion;

a scanner that scans an image on an original; and a touch operation portion that is operated by a user, wherein assuming that a direction perpendicular to the first surface of the casing is a front-to-back direction, the power operating portion is disposed on the first surface, which is parallel with a vertical direction of the casing, the touch operation portion is disposed on a second surface, which is parallel with the vertical direction of the casing and different from the first surface, and the second surface is positioned on a level different from a level of the first surface of the casing along the front-to-back direction by a level difference, the scanner is disposed to be openable and closable with respect to the casing, the power operating portion is disposed on a front of the casing, when the scanner is in a closed state, the touch operation portion covers a portion of the front of the casing with the level difference from the power operating portion, and when the scanner is in an open state, the touch operation portion is lifted following the scanner from the front of the casing while the power operating portion is fixedly disposed on the front of the casing.

2. The image forming apparatus according to claim 1, wherein the power operating portion and the touch operation portion are disposed at a front surface of the casing.

3. The image forming apparatus according to claim 1, further comprising:

an externally coupling portion at a front of the casing, the externally coupling portion coupling an external device, wherein the power operating portion is disposed above the externally coupling portion in a vertical direction of the casing.

4. The image forming apparatus according to claim 1, further comprising:

a medium discharging portion that discharges the medium from a front of the casing, wherein the power operating portion is disposed above the medium discharging portion in a vertical direction of the casing.

5. The image forming apparatus according to claim 1, further comprising:

a medium container that takes in the medium from a front of the casing, wherein the power operating portion is disposed above the medium container in a vertical direction of the casing.

6. The image forming apparatus according to claim 1, wherein the power operating portion is a mechanical switch.

7. The image forming apparatus according to claim 1, further comprising:

a substrate disposed at a vertical position that is different from a position of the power operating portion, the substrate including a control unit, wherein the power operating portion is coupled to the substrate via a cable.

8. The image forming apparatus according to claim 1, wherein the power operating portion is disposed on an extension of a center of the touch operation portion in a vertical direction.

9. The image forming apparatus according to claim 1, wherein the touch operation portion is supported so as to tilt with respect to the casing, and the power operating portion is disposed at the casing so as not to tilt with respect to the casing.

10. The image forming apparatus according to claim 1, further comprising:

a liquid container that contains liquid to be supplied to the image forming portion; and a liquid-level visual recognition portion disposed below the touch operation portion in a vertical direction of the casing, the liquid-level visual recognition portion being for use in viewing a remaining amount of the liquid in the liquid container.

11. An ink jet recording apparatus that is the image forming apparatus according to claim 1, wherein the image forming portion includes an ejecting head that ejects liquid droplets.

12. The image forming apparatus according to claim 1, wherein the level difference is from several millimeters to 1 cm.

13. The image forming apparatus according to claim 1, wherein the touch operation portion is rotatably supported with respect to the scanner.

* * * * *